United States Patent [19]

Hirata et al.

[11] Patent Number: 4,953,105
[45] Date of Patent: Aug. 28, 1990

[54] WORD PROCESSOR WITH A MERGE PRINT FUNCTION RESPONSIVE TO VARIABLE DATA LENGTH

[75] Inventors: Keiichi Hirata, Kuwana; Tomohiro Ban, Iwakura; Atsuko Kawasumi, Nagayo; Kazuko Nakagawa, Chita; Yukimi Mizutani, Ichinomiya; Satoru Tsuruki, Nagoya, all of Japan

[73] Assignee: Brother Kogyo Kabushiki Kaisha, Aichi, Japan

[21] Appl. No.: 72,566

[22] Filed: Jul. 13, 1987

[30] Foreign Application Priority Data

Jul. 15, 1986 [JP] Japan .................................. 61-166216

[51] Int. Cl.$^5$ ................................................ G06F 3/09
[52] U.S. Cl. .................................... 364/519; 364/518; 364/523; 400/70; 400/279
[58] Field of Search ........ 364/519, 518, 200 MS File, 364/900 MS File, 523; 400/279, 63, 83, 22, 61, 5

[56] References Cited

U.S. PATENT DOCUMENTS

| | | | |
|---|---|---|---|
| 4,566,127 | 1/1986 | Sekiya et al. | 382/56 |
| 4,575,813 | 3/1986 | Bartlett et al. | 364/900 |
| 4,635,212 | 1/1987 | Hatuzawa | 364/518 |
| 4,646,250 | 2/1987 | Children | 364/518 |
| 4,677,585 | 6/1987 | Ikegami et al. | 364/900 |
| 4,710,886 | 12/1987 | Heath | 364/519 |
| 4,723,209 | 2/1988 | Hernandez et al. | 364/300 |
| 4,736,308 | 4/1988 | Heckel | 364/518 |

FOREIGN PATENT DOCUMENTS 1175574 10/1984 Canada ............................ 364/519

OTHER PUBLICATIONS

Stockwell D. A., "Display with Partitioned Slow Scroll", IBM Technical Disclosure Bulletin, vol. 23, No. 4, 9/80.
QUE Corporation, "Using 1-2-3" Special Ed., 1987, Chapter 8, pp. 293-317.
Witkin R. K., "Managing Your Business With Multiplan", pp. 3-35, Microsoft Press, 1984.

Primary Examiner—Gary V. Harkcom
Assistant Examiner—Phu K. Nguyen
Attorney, Agent, or Firm—Oliff & Berridge

[57] ABSTRACT

A word processor with a merge print function which permits an insertion data file to be easily formed without troublesome operations an insertion data field can be adaptively expanded or has the capability to adaptively expand or contract an insertion data field to cope with either longer or shorter lengths of input data. The expansion or contraction is executed either manually by a specific key operation, or automatically according to the data length.

12 Claims, 6 Drawing Sheets

| | NAME | ADDRESS | | CITY · | ZIP |
|---|---|---|---|---|---|
| 1 | TOKKYO-TYOU | 4-3 KASUMIGASEKI b | | ↑ $\ell_3$ | |
| 2 | | | | ↑ | |
| 3 | | | | | |

$\ell_0$

Fig.5B

| | NAME | ADDRESS | | CITY |
|---|---|---|---|---|
| 1 | TOKKYO-TYOU | 4-3 KASUMIGASEKI | | TOKYO TIYODA |
| 2 | TARO YAMADA | 1-3 TORANOMON | | TOKYO TIYODA |
| 3 | KENTARO SAITOU | 3-27 FUSIMI | | NAGOYA |

$\ell_4$  $\ell_0$

WORD PROCESSOR WITH A MERGE PRINT FUNCTION RESPONSIVE TO VARIABLE DATA LENGTH

BACKGROUND OF THE INVENTION

1. Field of the Invention

This invention relates to a word processor, and more particularly to one provided with a merge printing function for inserting external data, which is read out in a predetermined order from a set of insertion data, into a corresponding location within a matrix of text data, by which a document with the inserted data is printed.

2. Discussion of Related Art

One type of prior art word processor is provided with an editing function by which one or more data can be replaced with other data within a matrix text. By utilizing such function, a plurality of documents with different data, such as person's name, address, name of society he belongs to, or the like can be printed based on the common matrix, text.

In this kind of word processor, matrix text data are stored in a document file, and variable insertion data are stored in an insertion data file. These two files are combined to be printed.

In one method for making the above-mentioned insertion data file, a predetermined format for inputting such data, e.g., name, address, place, and the like, within a limited length of data field is used. In another method, no format is contained within a system, but, the data field must be determined by the user prior to inputting the data.

In the former method, however, since the data field length is limited, a datum whose length exceeds the preset field length can not be input. For example, when the field of the name column is limited to 6 characters or less, or that of the address column is 10 characters or less, data having a length exceeding these field limitations cannot be input.

In the latter method, a format must be set prior to inputting data. When the data field is altered during editing, it is therefore required to reset the format.

SUMMARY OF THE INVENTION

Accordingly, an object of the present invention is to provide a word processor in which an insertion data file can be easily made without troublesome operations.

Another object is to provide a word processor in which the length of the data field can be altered by so as to cope with either shorter or longer lengths of input data.

In order to accomplish these and other objects, the word processor of the present invention includes, as shown in FIG. 1, a printing section D for printing a document C in which insertion data B are inserted into the corresponding locations addressed by labels within matrix text data A. The word processor of the present invention further includes: a display unit E for displaying input data; table memory means F1 for storing a table, the table including a plurality of data fields, each data field having a predetermined length; data memory means F2 for storing a plurality of external data to be inserted into the matrix text during printing; table display means G for showing the table on the display unit with each of the plurality of external data inserted in each of the plurality of data fields; data input means H for operatively inputting external data into the table; and alteration means I for controlling the table display means by operatively expanding and/or contracting the data field of the table.

In a word processor according to this invention, the insertion data B are inserted to the corresponding locations addressed by the labels within the matrix text data A, whereby a document with a combination of the matrix text data A and the insertion data B is printed.

Upon making the insertion data B, a table for inputting insertion data corresponding to the label name stored in the data memory means F2 is displayed with the table stored in the table memory means F1 on the display unit E by means of the table display means G. The insertion data are input through the data input means H by an operator referring to the table shown on the display unit E.

The length of the data field in the table can be altered by the alteration means I so as to cope with either shorter or longer lengths of the input data.

BRIEF DESCRIPTION OF THE DRAWING

In the accompanying drawings, there are shown illustrative embodiments of the invention from which these and other objects, features, and advantages will be readily apparent.

In the drawing:

FIGS. 4, 5A and 5B illustrate tables of the insertion data; and

DETAILED DESCRIPTION OF PREFERRED EMBODIMENTS

Figure 1:
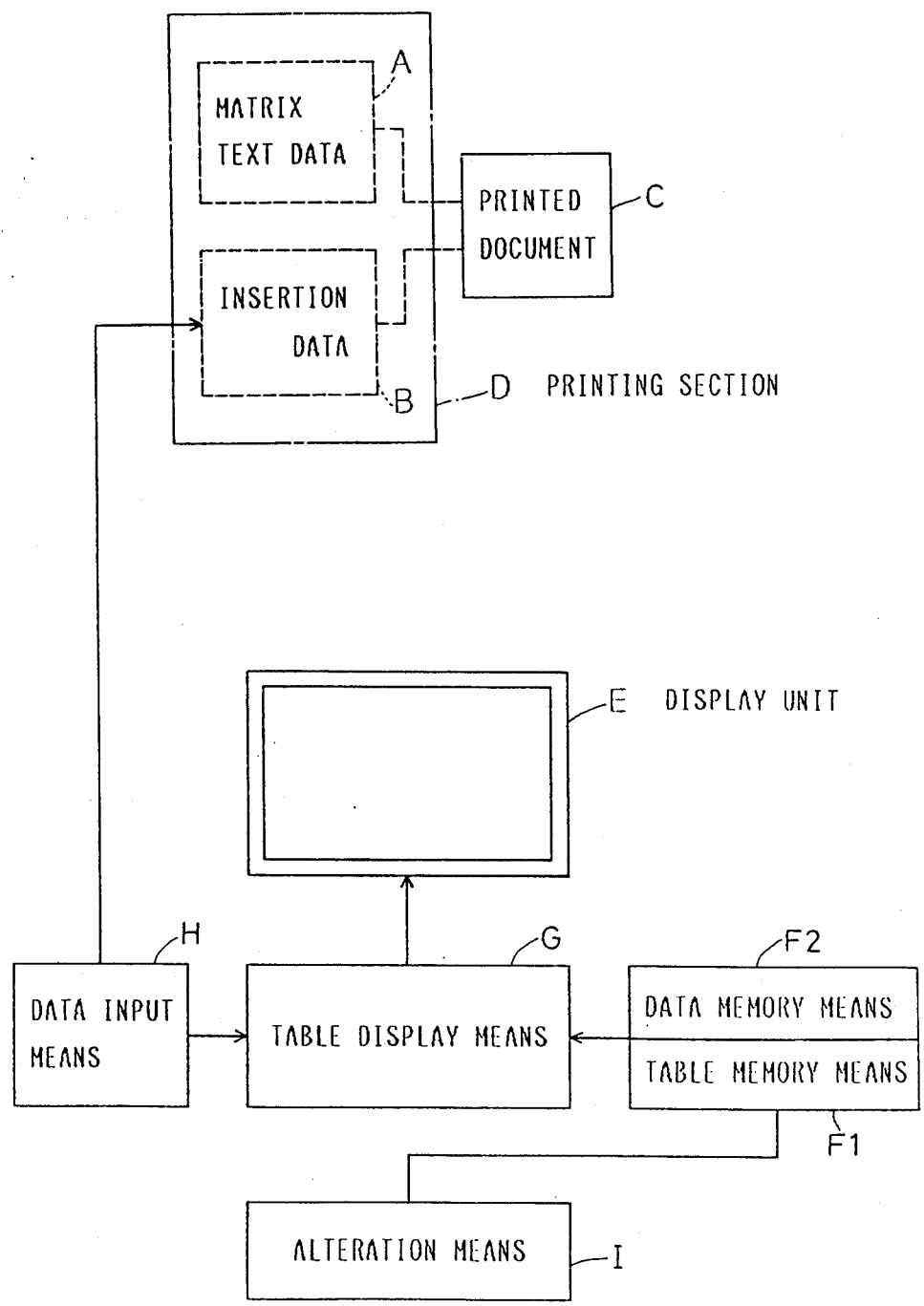
FIG. 1 is a block digram of the basic structure of a word processor constructed in accordance with the present invention.
Figure 2:
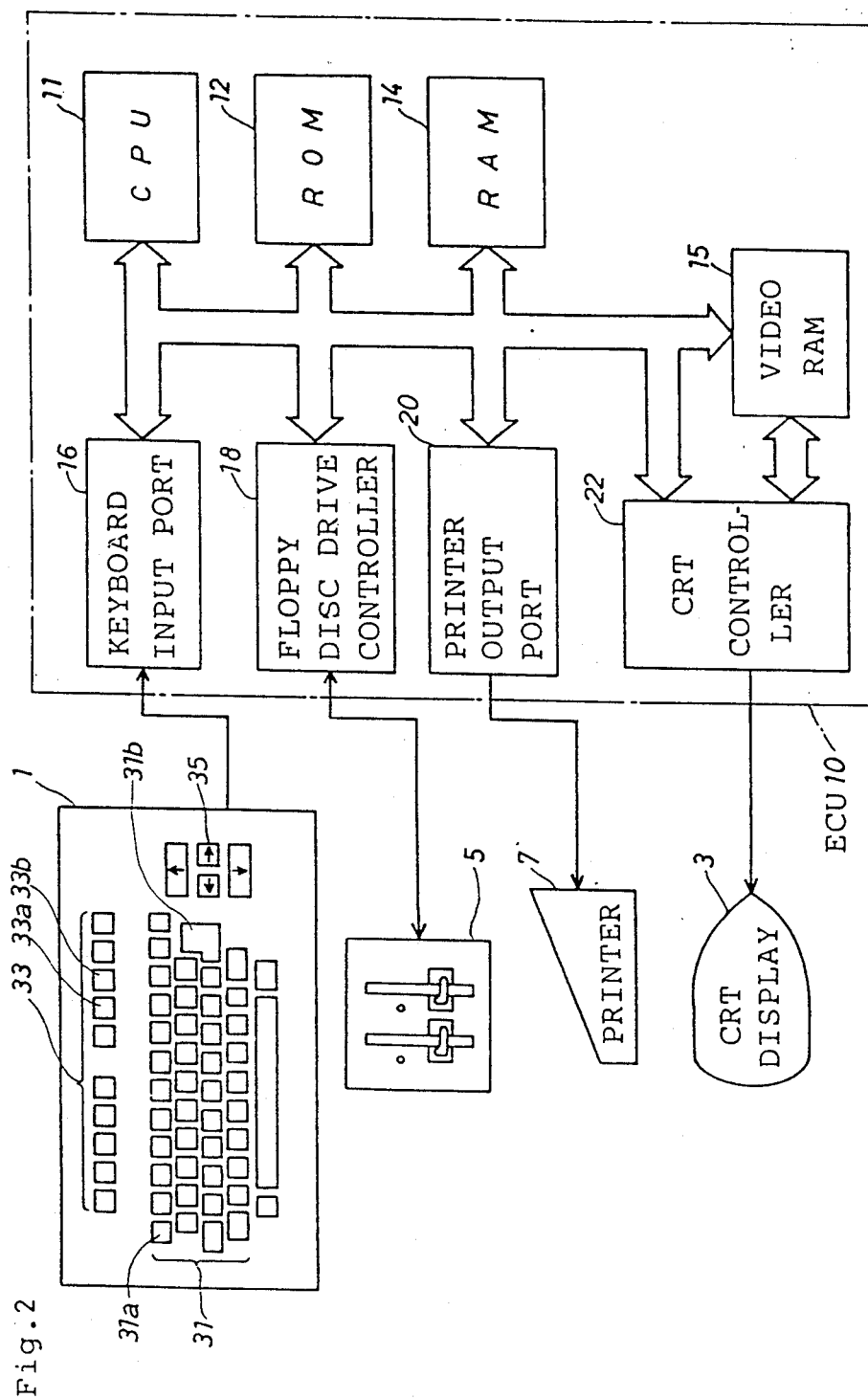
FIG. 2 is a block diagram illustrating a a first embodiment of a word processor constructed in accordance with the invention.

As shown in FIG. 2, a first embodiment of the word processor of the present invention is provided with: a keyboard 1 for inputting characters or editing commands; a display unit (CRT display) 3 for displaying characters or figures; a floppy disc drive 5 designed as an external memory; a printer 7 for printing characters or figures using a daisy-wheel type print element (not shown); and an electronic control unit (ECU) 10 interconnected with the above-mentioned units for controlling inputting, editing, and printing.

The ECU 10 is a microcomputer substantially consisting of CPU 11, ROM 12 and RAM 14. The ECU 10 further includes Video RAM 15 for storing picture data of characters or figures displayed on the CRT display 3; a CRT controller 22 for controlling the CRT display 3; an input port 16 for inputting data from the keyboard 1; a floppy disc drive controller 18 for controlling the floppy disc drive 5 so as to read and write data; and a printer output port 20 for outputting print data to the printer 7.

The keyboard 1 is provided with character keys and control keys 31 for inputting characters and inputting control codes for special fuctions of the typewriter, ten edit keys 33 for editing documents, and four cursor keys 35 for moving a cursor. The control keys 31 include a tab key 31a and a carriage return key 31b. The edit keys 33 include an expand key 33a for expanding a data field of the insertion data, and a contraction key 33b for contracting the field.

Figure 3:
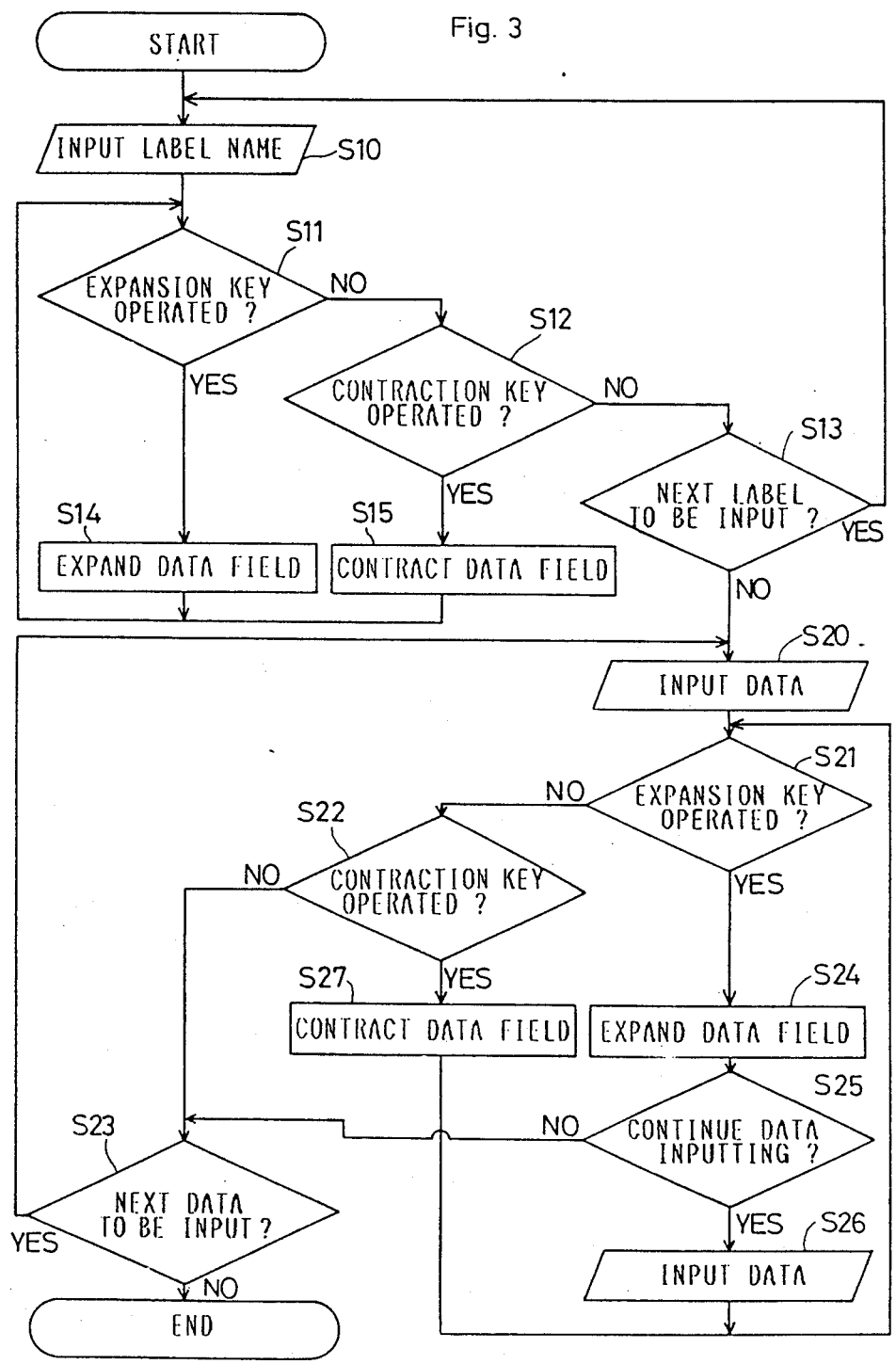
FIG. 3 is a flow chart showing the process steps of the procedure for expanding or contracting a.data field of the insertion data of the first embodiment.

A program routine which is performed for inputting the insertion data into the word processor will now be described referring to FIGS. 3, 4 and 5.

Figure 4:
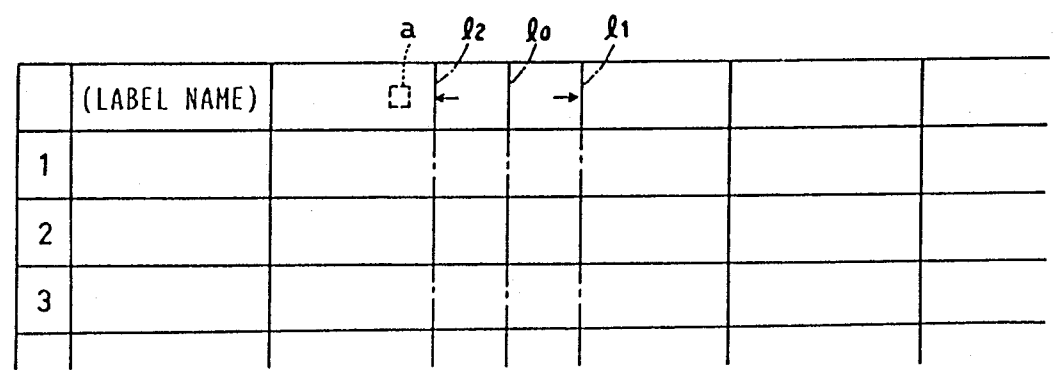

Upon inputting a command for making the insertion data, the table as shown in FIG. 4 is displayed on the CRT 3. In the table, each row corresponds to a set of insertion data to be inserted into one document. Each column corresponds to a label name. The first row is prepared for the label names.

When displaying the table of FIG. 4, the cursor is initially located at the head position of the cell of the first label.

Referring to the flow chart of FIG. 3, the program starts, a label name is input through the keyboard 1 at step 10 (steps in flow charts are hereinafter referred to as S, e.g., S10). At S11, it is determined whether the expand key 33a is operational. If the answer is NO, i.e., the length of the data field is not to be expanded, the program proceeds to S12. At S12, it is determined whether the contraction key 33b is operational. If the answer is NO, the program further proceeds to S13 where it is determined whether the next label name is to be input. If the answer is YES, the next label name is input at S10.

If case it is determined at S11 that the expand key 33a is operational, the data field is expanded at S14. Conversely, if the contraction key 33b is determined to be operational at S12, the data field is contracted at S15. For example, in FIG. 4, when the expand key 33a is operated with the cursor located at "a", the data field separator is shifted from 10 to 11. When the contraction key 33b is operated, the data field separator is shifted from 10 to 12. The expanding length (11−10) and the contracting length (10−12) are preset by the system or predetermined by the operator on the keyboard 1.

When label inputting is terminated, i.e., the determination at S13 is NO, the program proceeds to S20 where the insertion data are input.

While a datum is being inputted, it is determined at S21 whether the expand key 33a is operational. If the answer is YES, the data field is expanded at S24. At S25, a determination is made whether the data inputting is to be continued. If the answer is YES, the data are input within the data field at S26. For example, as shown in FIG. 5A, when the expand key 33a is operated with the cursor located at "b", the data field separator is shifted from 10 to 13. On the other hand, if the contraction key 33b is operated at S22, the data field is contracted at S27.

If the answer at S25 is NO, the program proceeds to S23 where it is determined whether the next data is to be input. If YES, the program returns to S20 and continues until the answer at S23 becomes NO, resulting in termination of the present routine.

In the present embodiment, the insertion data can be easily input with reference to the displayed table. Moreover, the data field can be altered by utilizing the expand key 33a or the contraction key 33b so as to cope with either longer or shorter lengths of insertion data.

In the first embodiment, the data field is altered by the operations of the expand key 33a and the contraction key 33b. In contrast to this, a second embodiment features the data field being automatically altered when a datum with its length exceeds the data field.

Figure 6:
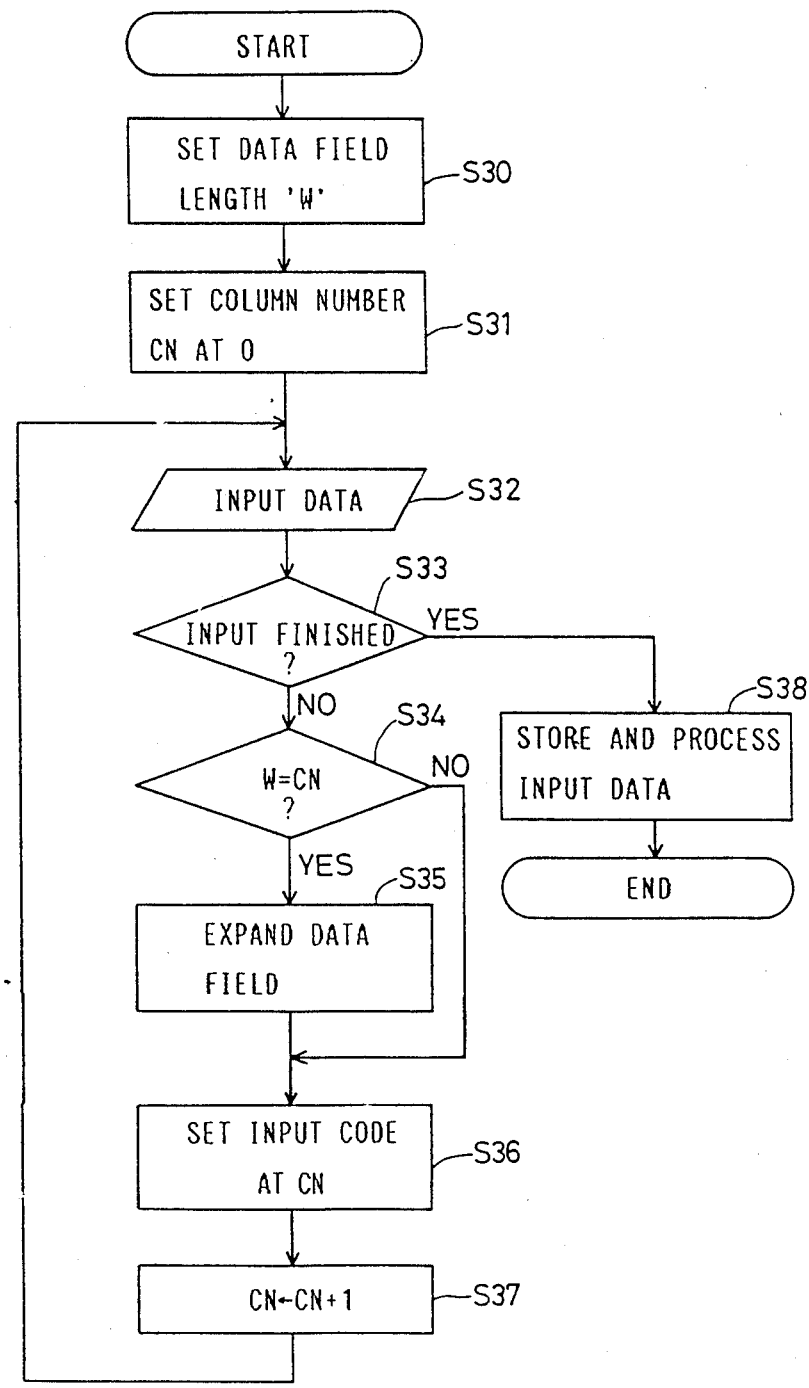
FIG. 6 is a flow chart showing the steps of the procedure executed in a second embodiment of the present invention.

Set forth below is the description of the second embodiment with reference to the flow chart of FIG. 6, which shows a program routine for automatically expanding a data field. By repeatedly executing the routine, each data field is expanded.

The program starts after a table of insertion data is displayed. First, the length W of the data field addressed by a cursor is determined at S30. For example, if the cursor is currently positioned at the data field of 10 characters length, the value of W is set at 10. Then, at S31, a column number CN indicating the current position of the cursor within the data field is set at 0.

Next, the program proceeds to S32 where data is input from the keyboard 1. At the subsequent step S33, it is determined whether the inputting operation is finished. If the answer is NO, the program further proceeds to S34, at which the predetermined length W of the data field is compared with the current column number CN. If CN<W, the program proceeds to S36 where the input character code, or the like, is set to the position addressed by the column number CN. Subsequently, the column number CN is incremented by 1 at S37. If it is determined that CN =W at S34, the program proceeds to S35, at which the data field is expanded by increasing the value W by 1.

When it is determined at S33 that the data input operation in the present data field is finished after repetition of the program steps S32 through S37, the input data is stored in an appropriate place within the memory at S38, and the present routine is then terminated.

Of course, the above-mentioned program for automatically altering the length of the data field is not limited only to expansion, but also enables contraction. In case the maximum length of input data corresponding to a label name is shorter than that of the preset field length, the data field can be automatically contracted from 10 to 14 when the operator operates a specially assigned key, e.g. the tab key 31a or the carriage return key 31b, after all the data input of one column is finished, as shown in FIG. 5B.

Obviously, numerous modifications and variations of the present invention are possible in the light of the above teachings. It is therefore to be understood that within the scope of the attached claims, the invention may be practiced otherwise than described herein. For example, this invention is not limited to the application to the word processor with the matrix text editing function, but it is also applicable to a data processor or a plain screen editor for data input.

What is claimed is:

1. A data processor with a table edit function, comprising:
   a display unit;
   table memory means for storing a table, the table including a plurality of data fields, each data field having a predetermined length;
   data memory means for storing a plurality of external data to be inserted into the table;
   table display means for displaying the table on the display unit with each of the plurality of external data inserted in a respective data field of the plurality of data fields;
   data input means for operatively inputting external data into the table; and
   alteration means for (i) changing the predetermined length of at least one selected data field of the table during inputting of external data into the table in response to a single operation of a selected one of a group of keys consisting of a field expansion key and a field contraction key, such that the alteration means expands the data field by a preset length responsive to a single operation of the field expansion key and contracts the data field by another preset length responsive to a single operation of the field contraction key; and (ii) for controlling the table display means to display the at least one changed selected data field and resultant table.

2. The data processor according to claim 1, wherein:
the table is arranged so that:
the table has one or more columns each corresponding to a label name in the matrix text,
each data field in the same column has the same length, and
the alteration means changes the length of all of the data fields in the same column at the same time.

3. The data processor according to claim 2, wherein each column comprises a plurality of rows, the first row of each column of the table is provided for a label name, and the second and the following rows are provided to accept external data to be inserted into the matrix text.

4. The data processor according to claim 2, wherein the alteration means expands the data field into which an external data is being inputted by a preset length when another data element of the external data is inputted through the data input means after the data field is full of data elements of the external data.

5. The data processor according to claim 2, wherein the alteration means contracts the data fields of a column to the length of the longest data in the same column responsive to a specific command from an operator for terminating the data input of the same column.

6. The data processor according to claim 1, wherein the alteration means expands the data field into which an external data is being inputted by a preset length when another data element of the external data is inputted through the data input means after the data field is full of data elements of the external data.

7. The data processor according to claim 1, wherein the alteration means contracts the data fields of a column to the length of the longest data in the same column responsive to a specific command from an operator for terminating the data input of the same column.

8. A data processor with a table edit function, comprising:
a display unit;
table memory means for storing a table, the table including a plurality of data fields, each data field having a predetermined length;
data memory means for storing a plurality of data to be inserted into each of the data fields of the table;
table display means for displaying the table on the display unit with each of the plurality of data fields;
data input means for operatively inputting external data into the table; and
alteration means for changing the predetermined length of at least one selected data field of the table during inputting of external data into the table automatically in response to the inputted external data and for controlling the table display means to display the at least one changed selected data field and resultant table.

9. The data processor according to claim 8, wherein:
the table is arranged so that:
the table has one or more columns;
each data field in the same column has the same length; and
the alteration means changes the length of all of the data fields in the same column at the same time.

10. The data processor according to claim 9, wherein the alteration means contracts the data field into which a data is being inputted to the length of the longest data in the same column responsive to a specific command from an operator for terminating the data input of the same column.

11. The data processor according to claim 8, wherein
the data processor is provided with at least one of the group consisting of a field expansion key and a field contraction key; and
the alteration means expands the data field by a preset length responsive to an operation of the field expansion key and contracts the data field by another preset length responsive to an operation of the field contraction key.

12. The data processor according to claim 8, wherein the alteration means expands the data field into which a data is being inputted by a preset length when another data element of the data is inputted through the data input means after the data field is full of data elements of the data.

* * * * *